United States Patent Office 3,443,504
Patented May 13, 1969

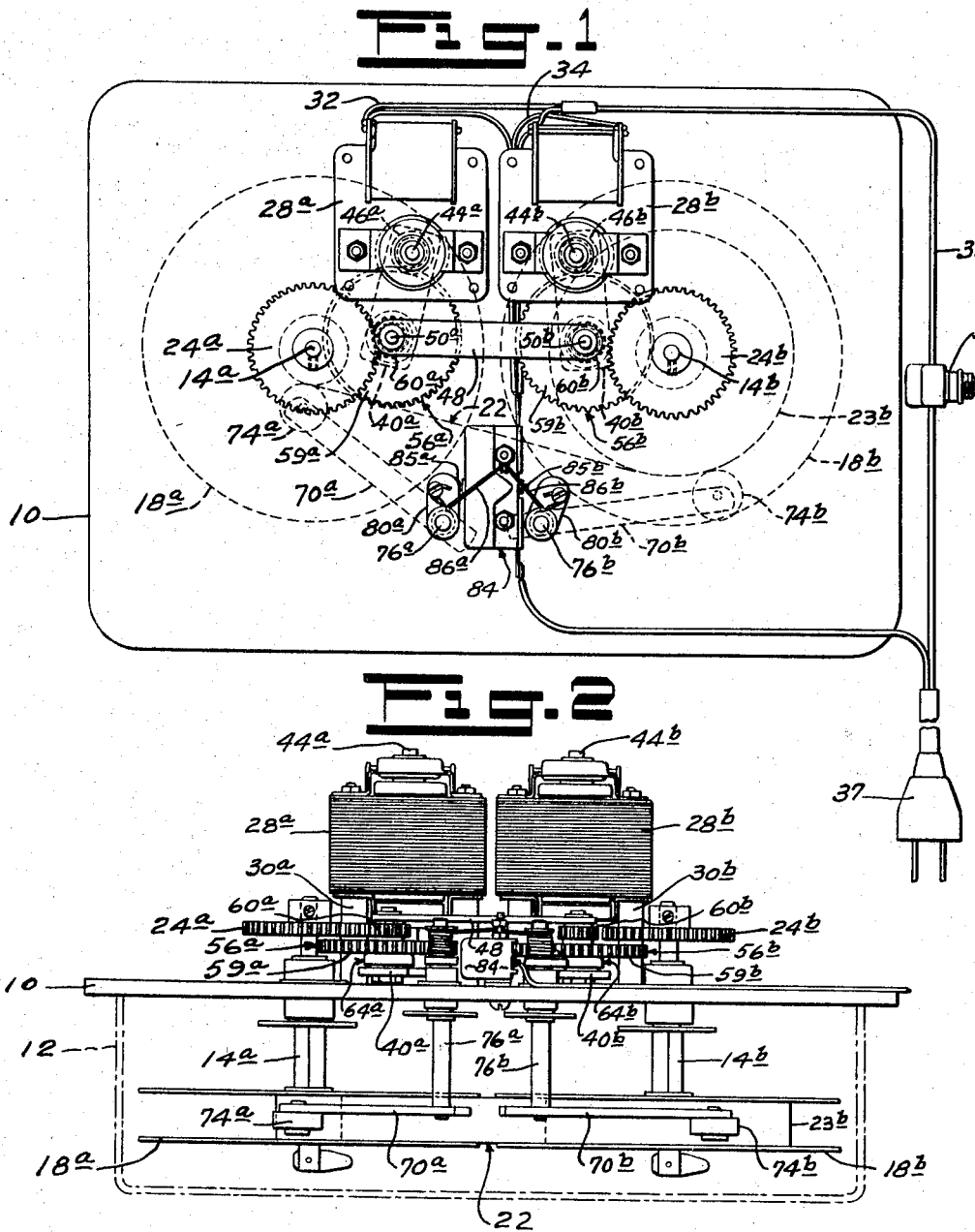

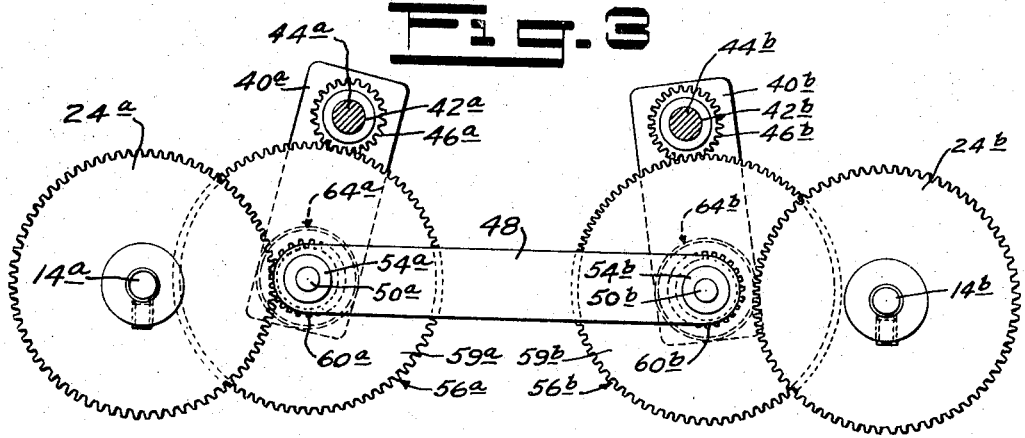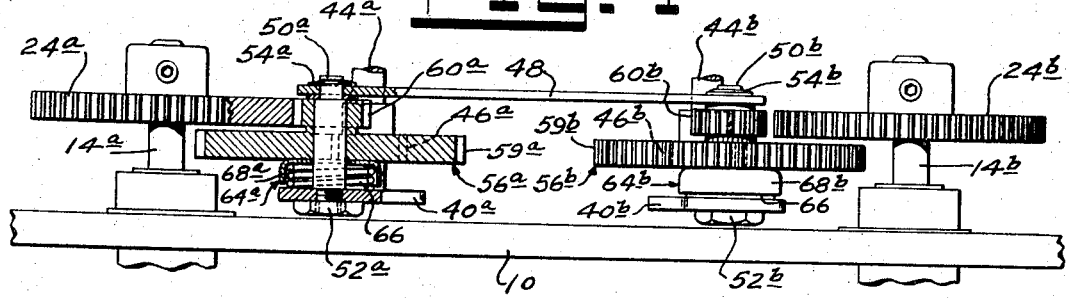

3,443,504
DRIVING AND CLUTCHING MECHANISM FOR FILM REELING APPARATUS OR THE LIKE
Michael Edward Rose, and Samuel Rose, both of 2160 Walton Ave., Bronx, N.Y. 10453
Filed June 14, 1966, Ser. No. 557,534
Int. Cl. G03d 1/14
U.S. Cl. 95—90.5                                                         8 Claims

ABSTRACT OF THE DISCLOSURE

Combined driving and clutching mechanism for reeling roll film from one reel to another. The mechanism includes a pair of electric motors with driving shafts and with nonrotatable shafts, a liquid tank, film winding means operatively connected to the driving shafts, including film reels adapted to be immersed in liquid in the tank and adapted to wind rolls of film back and forth, and a clutching mechanism operatively connected with each motor. The clutching mechanism includes a two-step gear and a spring detent around each nonrotatable shaft to apply spring pressure against its respective two-step gear thereby stopping the rotation of the two-step gear and placing the two-step gear in orbit. A switching mechanism is actuated by the film on the reels for automatically and selectively energizing either of the motors for actuating the clutching mechanism to drive the respective film reel.

---

This invention relates generally to combined driving and clutching mechanism and particularly to such mechanism for reeling roll film from one reel to another as disclosed in U.S. Letters Patent No. 2,595,545.

A principal object of the present invention is to provide driving and reeling mechanism for developing such films in an improved manner.

Another object of the invention is to provide improved mechanism for winding and unwinding reels for use in connection with film apparatus of any character.

By way of illustration, the invention will be shown as applied to the development of roll films of the ordinary size employed in hand and motion picture cameras, but it will be understood that the disclosure made herein is merely for the sake of illustration and that many changes and modifications may be made in the mode of construction and the form and relationship of the several elements without departing from the spirit and scope of the invention as defined in the appended claims.

In the accompanying drawings forming a material part of this disclosure:

FIG. 1 is a plan view of drive and reeling mechanism embodying the present invention applied to a reel roll film.

FIG. 2 is a front elevational view thereof.

FIG. 3 is a detail plan view of the bodily movable spur gears and associated parts.

FIG. 4 is a front view of the parts shown in FIG. 3, parts being shown in section.

Referring now in detail to the various views of the drawings, a rectangular-shaped supporting plate 10 is shown for supporting the various mechanisms of the apparatus. This plate may be made of any suitable material and it may form the top of the developer tank shown in dotted lines at 12, and may be provided with a removable top or cover (not shown). A pair of spaced spindles 14a and 14b on both sides of the longitudinal center of the plate extends downwardly through openings in the plate into the tank 12 and said spindles mount film reels 18a and 18b, respectively, for carrying film 22. Gears 24a and 24b are mounted on top of the spindles 14a and 14b, respectively.

A pair of motors 28a, 28b is mounted above the plate 10 at the rear center thereof on upright posts 30a, 30b, respectively. The motors are connected to a source of electric motive force by means of conductors 32 and 34 in a cable 36 and a plug 37. A main switch 38 is operatively connected in series to one of the conductors. A pair of rectangular-shaped plate-like arms 40a, 40b extends forwardly from and underneath the motors, the arms being formed with holes 42a, 42b, respectively, at the rear ends thereof through which extend the motor shafts 44a, 44b. Pinions 46a, 46b are fixed on the protruding ends of the motor shafts. The motor shafts turn in bearings pressed into arms 40a, 40b. A rectangular-shaped plate-like link 48 extends perpendicularly to the arms and connects the front ends of arms 40a, 40b by means of upright idler shafts 50a, 50b, extending through openings in the front ends of the arms 40a, 40b and secured by lock nuts 52a, 52b and through openings in the ends of the connecting link 48, retainer rings 54a, 54b being pressed over the top of the shafts above the link 48.

A two-step gear 56a including a large gear member 59a and a small gear member 60a is freely mounted on nonrotatable shaft 50a, and a similar two-step gear 56b is similarly mounted on nonrotatable shaft 50b, gear 56b having a large gear member 59b and a small gear member 60b. These gears 56a and 56b are idler gears and adapted to rotate freely on nonrotatable shafts 50a and 50b, respectively. The small gears 60a and 60b are on the same horizontal plane as the spindle gears 24a and 24b, on the spindles 14a and 14b, respectively, as shown in FIG. 4.

Referring to FIG. 4, a spring detent 64a is interposed between gear 56a and its adjacent arm 40a, and a spring detent 64b is interposed between gear 56b and its adjacent arm 40b. Each detent includes a coiled spring 66 encircling the shaft 50a or 50b and housed in an inverted cup-shaped housing 68a or 68b having a central hole for passage of the shaft 50a or 50b. One end of the spring 66 rests on arm 40a or 40b and the other end presses upwardly against the housing 68a or 68b which in turn is pressing upwardly against the undersurface of the gear 56a or 56b thereby applying the required constant pressure to said gear. Each detent comprising the spring 68 provides a sufficient pressure on gear 56a or 56b so that the force required to rotate the gear is greater than the force that is required to revolve it around its respective motor shaft 44a or 44b. Consequently when motor gear 46a, permanently in mesh with gear member 59a is put in motion, gear 56a is revolved until its gear member 60a meshes with gear 24a. The force required to continue gear 56a in its orbit has now become greater than that required to rotate it and it now goes into rotation, rotating spindle gear 24a.

When motor 28a is energized, gear 60a is instantly meshed with gear 24a and motor 28b is simultaneously deenergized and gear 60b is disengaged from gear 24b permitting spindle gear 24b to turn freely unencumbered by any meshing gear.

There is provided adjacent to each film reel but so positioned that they do not interfere with placing the reels on the shafts, follower arms 70a, 70b which are equipped with any suitable means such as the rollers 74a, 74b adapted to bear against the film wound on the reels. These arms are mounted on shafts 76a, 76b which move with the arms and which are supported on and extend through the plate 10. The upper ends of these arms carry actuating arms 80a, 80b. Adjacent the outer ends of arms 80a, 80b, there is positioned a single pole double-throw self-latching switch 84, with movable switch contact pins 85a, 85b on both sides thereof. A wire spring 86a is anchored on the casing of switch 84 and its other end wound around shaft 76a. Another wire spring 86b has one end anchored to the casing of switch 84 and its other end wound around shaft 76b.

Referring now to FIG. 1, it will be assumed that the reel 18b is filled with film generally denoted by the number 23b and that the outer end of leader strip of this film has been carried over and a few wraps of it wound around the hub of reel 18a. The switch actuating mechanism comprising the arms 70a, 70b, 80a, 80b is so set that switch 84 on the side of reel 18a now is in closed position. The switch actuating mechanism just described is held with its roller 74b in contact with roll 23b of film by means of its spring 86b in the manner that will be obvious.

It will be understood that the switch actuating mechanism and switch 84 employed in connection with reel 18a are the same as that just described for reel 18b and here the spring 86a associated therewith operates the same to hold the roller 74a in contact with film roll 23a.

When arm 80a actuates pin 85a of switch 84 to close the circuit through motor 28a, reel 18a proceeds to wind the film onto itself drawing it off of reel 18b, the switch remaining in closed position driving spindle gear 24a until the film from reel 18b is exhausted to within a few wraps of complete exhaustion when the follower arm 80b simultaneously depresses pin 85b of switch 84 adjacent to itself to close the circuit through motor 28b opening the circuit through the motor 28a and the cycle repeats itself.

An important advantage of the mechanism disclosed herein is the elimination of clutches and solenoids, thus eliminating the objectionable hum or vibration which often occurs with such solenoids or their equivalents, such as relays or the like, when they are kept energized by alternating current in order to hold a clutch or the like in position during the winding operations.

As one of the reels is always free when the other reel is winding, there is no strain placed on the film 22 extending between the reels.

The arms 70a and 70b being spring-pressed against the film act as brakes to prevent any over-run of film from the free reel.

The film may be wound on the reels so that the rollers 74a, 74b do not bear on the emulsion side of the film, and the motion of the film back and forth through the developer insures speedy and perfect developments of agitating the film in the developer or of agitating the developer itself, the motion of the film and the reels in the developer acting to stir the same.

While the invention is disclosed and applied to an automatic developing tank, it will be understood that the invention may be applied to any other device having film reels in a tank in which it is desired to transport a film from one reel to another, and then reverse the direction of movement of the film and rewind the same, or it is desired to alternate or reverse the direction of two spindles in any device.

We claim:

1. In apparatus for processing photographic film, in combination, a pair of electric motors operatively connected to a source of electromotive power, a driving shaft for each motor, a nonrotatable shaft associated with each motor driving shaft, a tank adapted to hold liquid, film winding means operatively connected to the motor driving shafts, said means including spindles, a gear fixed on one end of each spindle, a film reel fixed on the other end of said spindle, said film reels adapted to be immersed in liquid in said tank, said reels adapted to wind rolls of film back and forth from one reel to another, clutching mechanism associated with each motor for selectively connecting its nonrotatable shaft to its respective film reel, including a two-step gear interposed between its nonrotatable shaft and its respective film reel, and a spring detent around each nonrotatable shaft applying spring pressure against its respective two-step gear for yieldingly stopping the rotation of said two-step gear whereby said two-step gear may be placed in orbit, and switching mechanism actuated by the film on the reels for automatically and selectively energizing either of said motors whereby the energized motor functions to actuate the clutching mechanism and to drive the respective film reel.

2. In apparatus for processing photographic film as defined in claim 1 wherein a pinion is fixed on each driving shaft, said two-step gear including a gear member of larger diameter and a gear member of smaller diameter, the gear member of larger diameter being in mesh with the pinion on its respective driving shaft, the gear member of smaller diameter adapted to be moved into mesh with its respective spindle gear to drive such spindle gear around.

3. In apparatus for processing photographic film as defined in claim 2 wherein said clutching mechanism includes an arm connected at one end to the driving shaft of the respective motor and connected at the other end to the respective nonrotatable shaft, and an elongated link connecting the nonrotatable shafts, the spring detent including an inverted cup-shaped perforated housing around the spring on the nonrotatable shaft, said spring being seated on the arm and pressing against the base of the housing, said base pressing against the surface of the two-step gear to cause the orbiting of the two-step gear to bring the gear member of smaller diameter of said gear into mesh with its respective spindle gear for driving its respective film reel in one direction, and the two-step gear associated with the de-energized motor simultaneously moved away from its respective spindle gear whereby its respective film reel turns in the same direction as the direction of the film reel connected to the energized motor.

4. A combination as in claim 1 wherein the switch mechanism has movable contact members so positioned as to energize and to deenergize the driving means at moments when predetermined lengths of said leader and trailer portions of the film remain on the reels.

5. A combination as in claim 1 wherein the switch mechanism has movable contact members so positioned as to reverse the direction of driving of said film reels at moments when predetermined lengths of said leader and trailer portions remain on said reels.

6. A combination as in claim 1 wherein the switch mechanism has movable contact members, rollers carried by the movable contact members adapted to ride on the periphery of the film rolls, elongated follower arms mounting said rollers at one end thereof, and other follower arms interposed between said elongated follower arms and the movable contact members.

7. A combination as in claim 6 wherein the movable members of the switching mechanism are so positioned as to energize and to deenergize the driving means at moments when predetermined lengths of said leader and trailer portions of the film remain on the reels, and are so positioned as to reverse the direction of driving of said film reels at moments when predetermined lengths of leader and trailer portions remain on said reels.

8. A combination as in claim 6 wherein the movable contact member of the switching mechanism is so positioned as to energize or deenergize the driving means at moments when predetermined lengths of said leader and trailer portions of the film remain on the reels, and are so positioned as to reverse the direction of driving of said film reels at moments when predetermined lengths of said leader and trailer portions remain on said reels.

References Cited

UNITED STATES PATENTS

| | | | |
|---|---|---|---|
| 2,595,545 | 5/1952 | Rose et al. | 95—90.5 |
| 2,673,041 | 3/1954 | Hittle | 242—55.12 |
| 2,691,332 | 10/1954 | Happel | 95—90.5 |

NORTON ANSHER, *Primary Examiner.*

FRED L. BRAUN, *Assistant Examiner.*

U.S. Cl. X.R.

242—67.4